USO11833416B2

(12) United States Patent
Guerrero, Jr.

(10) Patent No.: US 11,833,416 B2
(45) Date of Patent: Dec. 5, 2023

(54) JOYSTICK DEVICE AND A METHOD OF MANUFACTURING THEREOF

(71) Applicant: Razer (Asia-Pacific) Pte. Ltd., Singapore (SG)

(72) Inventor: Gil Palma Guerrero, Jr., Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 435 days.

(21) Appl. No.: 17/282,975

(22) PCT Filed: Oct. 5, 2018

(86) PCT No.: PCT/SG2018/050504
§ 371 (c)(1),
(2) Date: Apr. 5, 2021

(87) PCT Pub. No.: WO2020/071997
PCT Pub. Date: Apr. 9, 2020

(65) Prior Publication Data
US 2021/0346793 A1 Nov. 11, 2021

(51) Int. Cl.
*A63F 13/24* (2014.01)
*A63F 13/2145* (2014.01)
(Continued)

(52) U.S. Cl.
CPC .......... *A63F 13/24* (2014.09); *A63F 13/2145* (2014.09); *A63F 13/285* (2014.09);
(Continued)

(58) Field of Classification Search
CPC .... A63F 13/24; A63F 13/2145; A63F 13/285; A63F 2300/1043; F16F 15/1215; F16F 15/1428; G05G 9/047; G05G 2009/04725
(Continued)

(56) References Cited

U.S. PATENT DOCUMENTS

| 4,433,217 A | 2/1984 | Griffith |
| 4,458,114 A | 7/1984 | May |

(Continued)

FOREIGN PATENT DOCUMENTS

| CN | 105188864 A | 12/2015 |
| EP | 0947949 A1 | 10/1999 |

(Continued)

OTHER PUBLICATIONS

Extended European Search Report dated Sep. 27, 2021, 6 pages, for the corresponding European Patent Application No. 18936104.1.
(Continued)

*Primary Examiner* — Allen Chan
(74) *Attorney, Agent, or Firm* — Polsinelli PC

(57) ABSTRACT

A joystick device including a hollow housing having an endless boundary structure and a ceiling structure with an opening; a control-stick having a head portion and a stem portion, the hollow housing surrounding the stem portion with the head portion outside the hollow housing; and a plurality of biasing curved arm members extending outwardly from the stem portion and movable with the control-stick as a whole relative to the hollow housing along a plane at least substantially perpendicular to the stem portion. Each of the plurality of biasing curved arm members having a curved segment with a convex side directed towards a respective corresponding portion of the endless boundary structure so as to bias the stem portion when the control-stick is being moved towards said portion. The plurality of biasing curved arm members being distributed around the stem portion so as to cooperate with each other to centre the control-stick.

20 Claims, 6 Drawing Sheets

(51) Int. Cl.
*A63F 13/285* (2014.01)
*F16F 15/121* (2006.01)
*F16F 15/14* (2006.01)
*G05G 9/047* (2006.01)

(52) U.S. Cl.
CPC ...... *F16F 15/1215* (2013.01); *F16F 15/1428* (2013.01); *G05G 9/047* (2013.01); *A63F 2300/1043* (2013.01); *G05G 2009/04725* (2013.01)

(58) Field of Classification Search
USPC .......................................................... 463/38
See application file for complete search history.

(56) References Cited

U.S. PATENT DOCUMENTS

| | | | |
|---|---|---|---|
| 4,465,908 A | 8/1984 | Griffith et al. | |
| 4,479,038 A | 10/1984 | Marhold et al. | |
| 6,641,479 B1* | 11/2003 | Ogata | A63F 13/285 |
| | | | 463/37 |
| 6,966,761 B1 | 11/2005 | Roke et al. | |
| 9,170,658 B2 | 10/2015 | Quek | |
| 9,925,456 B1 | 3/2018 | Hershey et al. | |
| 10,203,717 B2* | 2/2019 | Olsson | G06F 3/0338 |
| 2008/0068333 A1 | 3/2008 | Lye et al. | |
| 2010/0045593 A1* | 2/2010 | Washio | G06F 3/0338 |
| | | | 345/156 |
| 2011/0183759 A1 | 7/2011 | Lin | |
| 2012/0169597 A1 | 7/2012 | Liotta | |
| 2013/0249830 A1 | 9/2013 | Quek | |
| 2013/0265233 A1 | 10/2013 | Obermeyer et al. | |
| 2014/0094310 A1 | 4/2014 | Bleich et al. | |
| 2014/0253446 A1 | 9/2014 | Petersen | |
| 2017/0246533 A1 | 8/2017 | LaChappelle et al. | |
| 2018/0135738 A1 | 5/2018 | Yin et al. | |

FOREIGN PATENT DOCUMENTS

| | | |
|---|---|---|
| JP | 2003-247580 A | 9/2003 |
| WO | WO 2012/005463 A2 | 1/2012 |
| WO | WO 2012/105738 A1 | 8/2012 |
| WO | WO 2016/066508 A1 | 5/2016 |
| WO | WO 2016/110646 A1 | 7/2016 |

OTHER PUBLICATIONS

Office Action dated Oct. 11, 2021, for the corresponding Chinese Application No. 2018800995942 in 7 pages.

* cited by examiner

JOYSTICK DEVICE AND A METHOD OF MANUFACTURING THEREOF

TECHNICAL FIELD

Various embodiments generally relate to a joystick device, and a method of manufacturing thereof. In particular, various embodiments generally relate to a joystick device for a touchscreen.

BACKGROUND

Mobile game typically displays virtual buttons on a touchscreen of the mobile device for a user to provide inputs to the game. However, such virtual buttons lack tactile feel and generally provide poor gaming experience for the user. In recent years, a number of mobile gaming accessories have been developed to enhance the user experience. For example, handheld controllers (similar to a game-set controller) have been adapted for attaching and coupling to the mobile phone so as to provide physical buttons and controls for the user. However, such handheld controllers are typically bulky and may be rather costly.

Accordingly, there is a need for a simpler and cheaper solution of providing tactile feel to enhance the mobile gaming experience.

SUMMARY

According to various embodiments, there is provided a joystick device. The joystick device may include a hollow housing formed by an endless boundary structure and a ceiling structure having an opening. The joystick device may further include a control-stick having a head portion and a stem portion. The hollow housing may be surrounding the stem portion of the control-stick such that the control-stick may extend through the opening in the ceiling structure of the hollow housing with the head portion of the control-stick outside the hollow housing. The joystick device may further include a plurality of biasing curved arm members extending outwardly from the stem portion of the control-stick in a manner so as to be movable with the control-stick relative to the hollow housing along a plane at least substantially perpendicular to the stem portion. Each of the plurality of biasing curved arm members may extend from the stem portion along the plane and may have a curved segment with a convex side of the curved segment directed towards a respective corresponding portion of the endless boundary structure of the hollow housing so as to bias the stem portion of the control-stick away from the respective corresponding portion of the endless boundary structure of the hollow housing when the control-stick is being moved towards the respective corresponding portion of the endless boundary structure. The plurality of biasing curved arm members and the control-stick may be movable as a whole relative to the hollow housing along the plane. The plurality of biasing curved arm members may be distributed along a circumference of the stem portion of the control-stick in a manner so as to cooperate with each other to centre the control-stick with respect to the opening of the ceiling of the hollow housing.

According to various embodiments, there is provided a joystick device. The joystick device may include a hollow housing which may include an endless boundary structure and a ceiling structure to define an internal space. The hollow housing may be provided with an opening through the ceiling structure. The joystick device may further include a control-stick having a head portion and a stem portion extending through the opening of the ceiling structure. The hollow housing may be surrounding the stem portion of the control-stick with the head portion of the control-stick outside the hollow housing. The control-stick may be made of electrical conductive material. The joystick device may further include a ring made of electrical insulating material fixedly coupled around the stem portion of the control-stick. The joystick device may further include a plurality of biasing curved arm members extending from the ring to form a radial arrangement around the stem portion of the control-stick in a manner so as to be movable with the control-stick as a whole relative to the hollow housing along a plane at least substantially perpendicular to the stem portion. Each of the plurality of biasing curved arm members may extend from the ring along the plane and may have a curved segment with a convex side of the curved segment directed towards a respective corresponding portion of the endless boundary structure of the hollow housing so as to bias the stem portion of the control-stick away from the respective corresponding portion of the endless boundary structure of the hollow housing when the control-stick is being moved towards the respective corresponding portion of the endless boundary structure. The plurality of biasing curved arm members may be distributed along a circumference of the stem portion of the control-stick in a manner so as to cooperate with each other to centre the control-stick with respect to the opening of the ceiling of the hollow housing.

According to various embodiments, there is provided a method of manufacturing a joystick device. The method may include insert moulding a ring made of electrical insulating material around a stem portion of a control-stick made of electrical conductive material. Four biasing curved arm members may extend from the ring to form a quatrefoil-like shape around the stem portion of the control-stick. The method may further include providing the control-stick to a hollow housing which may include an endless boundary structure and a ceiling structure to define an internal space. The hollow housing may be provided with an opening through the ceiling structure of the hollow structure such that the hollow housing may surround the stem portion of the control-stick and the control-stick may extend through the opening in the ceiling structure of the hollow housing with the head portion of the control-stick outside the hollow housing. The four biasing curved arm members and the control-stick may be movable as a whole relative to the hollow housing along a plane at least substantially perpendicular to the stem portion of the control-stick. Each of the four biasing curved arm members may extend from the ring along the plane and may have a curved segment with a convex side of the curved segment directed towards a respective corresponding portion of the endless boundary structure of the hollow housing so as to bias the stem portion of the control-stick away from the respective corresponding portion of the endless boundary structure of the hollow housing when the control-stick is being moved towards the respective corresponding portion of the endless boundary structure. The four biasing curved arm members may be distributed along a circumference of the stem portion of the control-stick in a manner so as to cooperate with each other to centre the control-stick with respect to the opening of the ceiling of the hollow housing.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Embodiments described below in the context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments generally relate to a joystick device, and a method of manufacturing thereof. The joystick device may be configured for a touchscreen of an electronic device. The touchscreen may be on a mobile phone or a tablet or a laptop or any personal electronic devices. The joystick device may be configured for attaching to the touchscreen such that the joystick device may function as a physical interface between the user and the virtual buttons displayed on the touchscreen so as to provide a tactile feel for the user. According to various embodiments, the joystick device may include a center-stick or a control-stick such that the user may move or slide the center-stick or control-stick relative to the touchscreen so as to move over or on top of the various virtual buttons displayed on the touchscreen for activating the different virtual buttons on the touchscreen via the center-stick or the control-stick. According to various embodiments, the center-stick or the control-stick may be moved laterally along the surface of the touchscreen so as to activate the different virtual buttons on the touchscreen. According to various embodiments, the joystick device may be configured to center the center-stick or the control-stick after it has been moved. Accordingly, the center-stick or the control-stick may return to its initial or original center position after the user let go of the center-stick or the control-stick. Further, the center-stick or the control-stick may be freely rotatable about its longitudinal axis relative to a housing of the joystick device.

Figure 1A:
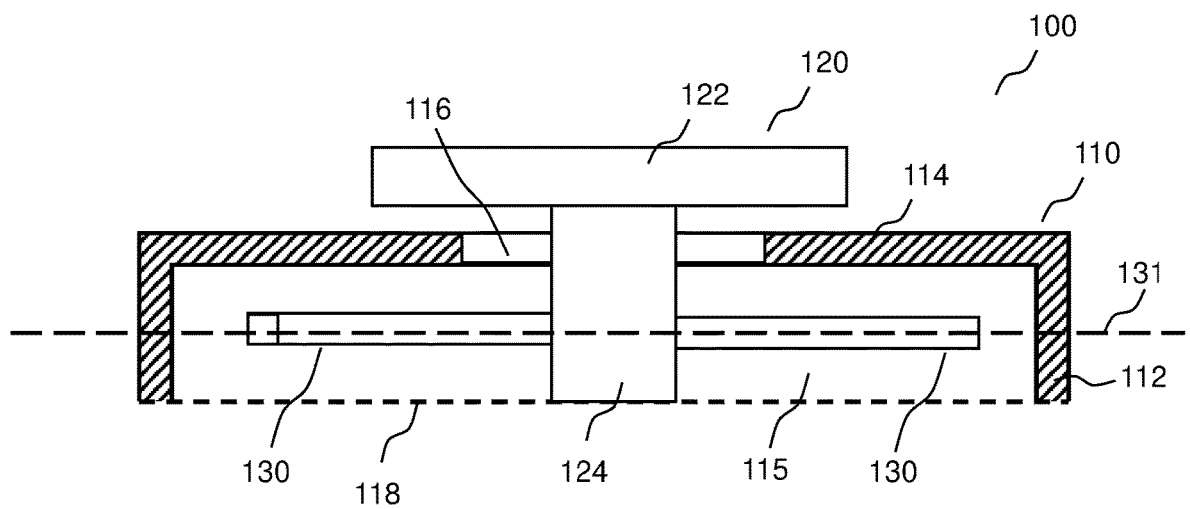
FIG. 1A shows a schematic diagram illustrating a side cut-out view of a joystick device according to various embodiments.
Figure 1B:
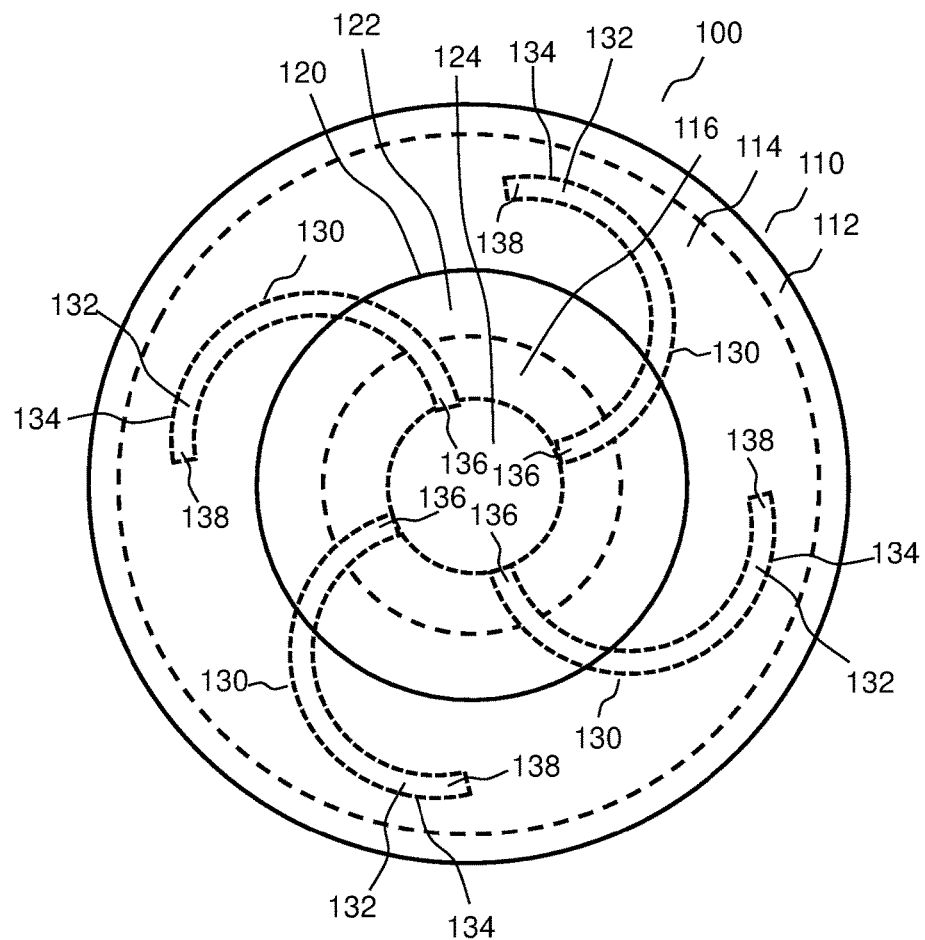
FIG. 1B shows a schematic diagram illustrating a top view of the joystick device of FIG. 1A according to various embodiments.

FIG. 1A shows a schematic diagram illustrating a side cut-out view of a joystick device 100 according to various embodiments. FIG. 1B shows a schematic diagram illustrating a top view of the joystick device 100 of FIG. 1A according to various embodiments. The joystick device 100 may be configured for a touchscreen of an electronic device. As shown in FIG. 1A and FIG. 1B, the joystick device 100 may include a hollow housing 110 formed by an endless boundary structure 112 and a ceiling structure 114 having an opening 116. The endless boundary structure 112 may be a main body (or a bottom housing portion) of the hollow housing 110 and the ceiling structure 114 may be a top cover (or a top housing portion) of the hollow housing 110. The endless boundary structure 112 and the ceiling structure 114 may define an internal space 115 of the hollow housing 110. The opening 116 may be through the ceiling structure 114 of the hollow housing 110. According to various embodiments, the endless boundary structure 112 may be a circular or an annular side wall. According to various embodiments, the endless boundary structure 112 may also be a series of side walls joined together to form a closed loop. The ceiling structure 114 may be disposed to cover a top end of the endless boundary structure 112. According to various embodiments, the endless boundary structure 112 and the ceiling structure 114 may be integrally moulded or integrally formed or integrally printed as a single unitary structure or a one-piece structure. According to various embodiments, the endless boundary structure 112 and the ceiling structure 114 may be separate pieces or separate parts joined together to form the hollow housing 110.

As shown in FIG. 1A and FIG. 1B, the joystick device 100 may include a control-stick 120 having a head portion 122 and a stem portion 124. The head portion 122 may be a thumb rest of the control-stick 120. According to various embodiments, the head portion 122 and the stem portion 124 may be two separate parts coupled together to form the control-stick 120. According to various other embodiments, the head portion 122 and the stem portion 124 may be integrally moulded or integrally formed or integrally printed to form the control-stick 120. According to various embodiments, the hollow housing 110 may surround the stem portion 124 of the control-stick 120 such that the control-stick 120 may extend through the opening 116 in the ceiling structure 114 of the hollow housing 110 with the head portion 122 of the control-stick 120 outside the hollow housing 110. Accordingly, the hollow housing 110 may form an enclosure around the stem portion 124 of the control-stick 120, and the stem portion 124 of the control-stick 120 may be extending through the opening 116 in the ceiling structure 114 of the hollow housing 110 such that the head portion 122 of the control-stick 120 may be outside the hollow housing 110.

According to various embodiments, the stem portion 124 of the control-stick 120 may be of an elongate shape and the opening 116 of the ceiling structure 114 of the hollow housing 110 may have a shape corresponding to a cross-section of the stem portion 124 of the control-stick 120. According to various embodiments, the opening 116 of the ceiling structure 114 of the hollow housing 110 may have a dimension (e.g. width or diameter) larger than a corresponding dimension of the cross-section of the stem portion 124 of the control-stick 120. For example, according to various embodiments, the stem portion 124 of the control-stick 120 may be cylindrical in shape and the opening 116 of the ceiling structure 114 of the hollow housing 110 may be circular. Accordingly, a diameter of the stem portion 124 of the control-stick 120 may be smaller than a diameter of the opening 116 of the ceiling structure 114 of the hollow housing 110. According to various embodiments, the difference in dimension (e.g. width or diameter) between the stem portion 124 and the opening 116 may provide some leeway or space for the stem portion 124 of the control-stick 120 to move laterally (with respect to the opening 116) within the limit or extent or boundary set by the opening 116 of the ceiling structure 114 of the hollow housing 110.

According to various embodiments, the head portion 122 (or the thumb rest) of the control-stick 120 may be configured or shaped ergonomically for receiving a user's thumb such that the user's thumb may interact efficiently with the control-stick 120 via the head portion 122 for controlling the movement of the control-stick 120. Accordingly, the head portion 122 of the control-stick 120 may generally have a rounded planar shape, such as circular or oval or elliptical, so as to provide sufficient support for receiving the ball of the user's thumb (i.e. the fleshy portion of the first segment of the user's thumb opposite the nail). According to various embodiments, the head portion 122 of the control-stick 120 may be in the form of a disc or rounded plate. According to various embodiments, the head portion 122 of the control-stick 120 may have a domed top, or a flat top, or a concave top. According to various embodiments, a dimension (e.g. width or diameter) of the opening 116 of the ceiling structure 114 of the hollow housing 110 may be smaller than a corresponding dimension (e.g. width or diameter) of the head portion 122 of the control-stick 120. Accordingly, the difference in diameters between the head portion 122 and the opening 116 may prevent the head portion 122 of the control-stick 120 from falling into or entering the internal space 115 of the hollow housing 110 via the opening 116 in the ceiling structure 114.

According to various embodiments, a length of the stem portion 124 of the control-stick 120 may be longer than a height of the endless boundary structure 112 of the hollow housing 110. Accordingly, the head portion 122 of the control-stick 120 may remain outside the hollow housing 110 when the stem portion 124 of the control-stick 120 is inserted into the hollow housing 110.

As shown in FIG. 1A and FIG. 1B, the joystick device 100 may include a plurality of biasing curved arm members 130 extending outwardly from the stem portion 124 of the control-stick 120 in a manner so as to be movable with the control-stick 120 as a whole relative to the hollow housing 110 along a plane 131 at least substantially perpendicular to the stem portion 124 of the control-stick 120. Accordingly, the plurality of biasing curved arm members 130 may form a radial arrangement around the stem portion 124 of the control-stick 120. The plurality of biasing curved arm members 130 may be integrated with the stem portion 124 of the control-stick 120 such that the plurality of biasing curved arm members 130 and the control-stick 120 together constitute a single part or a single unit. Thus, the plurality of biasing curved arm members 130 may be moved together with the control-stick 120 as a whole in a same motion and/or same direction when the control-stick 120 is being moved. On the other hand, the hollow housing 110 may be a separate part or a separate unit such that the hollow housing 110 is not attached or fastened or joined or secured or fixed or connected to the control-stick 120 and/or the plurality of biasing curved arm members 130 in anyway. Accordingly, the control-stick 120 and the plurality of biasing curved arm members 130 may not be attached or fastened or joined or secured or fixed or connected to the hollow housing 110 (or may be unattached or unconnected or disjointed with the hollow housing 110, or may be free from being attached or fastened or joined or secured or fixed or connected to the hollow housing 110). Accordingly, the control-stick 120 and the plurality of biasing curved arm members 130 may be a first part of the joystick device 100 while the hollow housing 110 may be a separate second part of the joystick device 100 such that the first and second part of the joystick device 100 may be separate parts or disjointed parts or independent parts which are movable relative to each other. Hence, with the plurality of biasing curved arm members 130 and the control-stick 120 forming the first part of the joystick device 100 and the hollow housing forming the second separate part of the joystick device 100, the plurality of biasing curved arm members 130 may be unattached or unconnected or disjointed with the hollow housing 110 (or may be free from being attached or fastened or joined or secured or fixed or connected to the hollow housing 110). According to various embodiments, the plurality of biasing curved arm members 130 and the control-stick 120 may be movable laterally as a whole relative to the hollow housing 110 along the plane 131. Accordingly, the plurality of biasing curved arm members 130 may be movable as a whole relative to the hollow housing 110 along the plane 131. According to various embodiments, the plurality of biasing curved arm members 130 and the control-stick 120 may be freely rotatable as a whole relative to the hollow housing 110 about a longitudinal axis of the control-stick 120. Accordingly, the plurality of biasing curved arm members 130 may be rotatably movable as a whole relative to the hollow housing 110 about the longitudinal axis of the control-stick 120. For example, the plurality of biasing curved arm members 130 may rotate or revolve at least one complete round about the longitudinal axis of the control-stick 120.

According to various embodiments, each of the plurality of biasing curved arm members 130 may extend from the stem portion 124 of the control-stick 120 along the plane 131 and has a curved segment 132 with a convex side 134 of the curved segment 132 directed towards a respective corresponding portion of the endless boundary structure 112 of the hollow housing 110 so as to bias the stem portion 124 of the control-stick 120 away from the respective corresponding portion of the endless boundary structure 112 of the hollow housing 110 when the control-stick 120 is being moved towards the respective corresponding portion of the endless boundary structure 112 of the hollow housing 110. According to various embodiments, the curved segment 132 of each of the plurality of biasing curved arm members 130 may be loosely abutting the respective corresponding portion of the endless boundary structure 112 of the hollow housing 110 such that the convex side 134 of the curved segment 132 may contact the respective corresponding portion of the endless boundary structure 112 of the hollow housing 110 for biasing when the control-stick 120 is being moved towards the respective corresponding portion of the endless boundary structure 112 of the hollow housing 110, and the convex side 134 of the curved segment 132 may be moved away or apart from the respective corresponding portion of the endless boundary structure 112 of the hollow housing 110 when the control-stick 120 is being moved in an opposite direction away from the respective corresponding portion of the endless boundary structure 112 of the hollow housing 110.

According to various embodiments, moving the control-stick 120 towards the respective corresponding portion of the endless boundary structure 112 of the hollow housing 110 may compress the respective biasing curved arm member 130 as the respective biasing curved arm member 130 is being urged against the respective corresponding portion of the endless boundary structure 112 of the hollow housing 110. According to various embodiments, the plurality of biasing curved arm members 130 may be made of resilient material. Accordingly, compressing the respective biasing curved arm members 130 may cause the respective biasing curved arm members 130 to generate a biasing force with a tendency to return the respective biasing curved arm members 130 back to the uncompressed original state which may move the control-stick 120 back to its initial or original position once the user release the control-stick 120. On the other hand, since the plurality of biasing curved arm members 130 may not be attached or fastened or joined or secured or fixed or connected to the hollow housing 110 (or may be unattached or unconnected or disjointed with the hollow housing 110, or may be free from being attached or fastened or joined or secured or fixed or connected to the hollow housing 110), when the control-stick 120 is being moved in an opposite direction away from the respective corresponding portion of the endless boundary structure 112 of the hollow housing 110, the respective biasing curved arm member 130 may remain in its original state without being subjected to any loading, such as tension. Accordingly, each of the plurality of biasing curved arm members 130 may only be subjected to compression forces when being urged against the respective corresponding portion of the endless boundary structure 112 of the hollow housing 110 as the control-stick 120 is being moved towards the respective corresponding portion of the endless boundary structure 112 of the hollow housing 110. Thus, the plurality of biasing curved arm members 130 according to the various embodiments may be more reliable and durable because the plurality of biasing curved arm members 130 is not exposed to cyclic compression and tension, which may lead to premature failure as a result of fatigue or permanent deformation. For example, cyclic compression and tension may occur if each of the plurality of biasing curved arm members is being attached or fastened or joined or secured or fixed or connected to both the stem portion of the control-stick and the hollow housing.

According to various embodiments, each of the plurality of biasing curved arm members 130 may be in the form of a stripe of resilient material extending from the stem portion 124 of the control-stick 120 along the plane 131. The stripe of resilient material may extend into a curve having an outline that bends continuously. According to various embodiments, each of the plurality of biasing curved arm members 130 may include a first end 136 integral to the stem portion 124 of the control-stick 120. Accordingly, each of the plurality of biasing curved arm members 130 may extend from the stem portion 124 of the control-stick 120 via the respective first end 136 in a continual or unbroken or uninterrupted manner. According to various embodiments, each of the plurality of biasing curved arm members 130 may include a second end 138. According to various embodiments, the second end 138 may be a free-end. Accordingly, the second end 138 of each of the plurality of biasing curved arm members 130 in the form of the free-end may be relatively unrestricted (or unrestrained) and free from being attached or fastened or joined or secured or fixed or connected or confined or bound to any structure. According to various other embodiments, the second end 138 may be coupled to an adjacent biasing curved arm member 130. Accordingly, the plurality of biasing curved arm members 130 may be interconnected via the second end 138.

According to various embodiments, the plurality of biasing curved arm members 130 may curve in the same direction. For example, as shown in FIG. 1A and FIG. 1B, the plurality of biasing curved arm members 130 may curve in a counter-clockwise direction. According to various other embodiments, the plurality of biasing curved arm members 130 may curve in a clock-wise direction. According to various embodiments, the plurality of biasing curved arm members 130 may have the same curvature.

According to various embodiments, the plurality of biasing curved arm members 130 may be distributed along a circumference of the stem portion 124 of the control-stick 120 in a manner so as to cooperate with each other to centre the control-stick 120 with respect to the opening 116 of the ceiling 114 of the hollow housing 110. Accordingly, the plurality of biasing curved arm members 130 may be efficiently dispersed or spread around the stem portion 124 of the control-stick 120 such that, regardless of whichever radial direction the control-stick 120 is being moved relative to the opening 116 of the ceiling 114 of the hollow housing 110, one or more of the plurality of biasing curved arm members 130 may bias the control-stick 120 in the opposite direction so as to provide a biasing force to return the control-stick 120 to its original or initial position. According to various embodiments, the original or initial position of the control-stick 120 may be at the centre of the opening 116 of the ceiling 114 of the hollow housing 110.

According to various embodiments, the plurality of biasing curved arm members 130 may include two or three or four or more biasing curved arm members 130 forming a radial arrangement around the stem portion 124 of the control-stick 120. According to various embodiments, the plurality of biasing curved arm members 130 may include four biasing curved arm members 130 forming a quatrefoil-like shape around the stem portion 124 of the control-stick 120. The quatrefoil-like shape formed by the four biasing curved arm members 130 may provide an effective and efficient radial arrangement in the form of a 'clover-leaf spring' to centre the control-stick 120 with respect to the opening 116 of the ceiling 114 of the hollow housing 110 when the opening 116 is located at the centre of the ceiling 114.

According to various embodiments, the dimension (e.g. width or diameter) of the opening 116 of the ceiling structure 114 of the hollow housing 110 may be smaller than a corresponding dimension (e.g. width or diameter) of the radial arrangement formed by the plurality of biasing curved arm members 130 around the stem portion 124 of the control-stick 120. Accordingly, the difference in dimensions between the opening 116 and the radial arrangement may prevent the control-stick 120 from being pulled out or drawn out of the internal space 115 of the hollow housing 110 via the opening 316 in the ceiling structure 114.

According to various embodiments, the control-stick 120 may be made of electrical conductive material such that the touchscreen of the electronic device may sense or detect the movement of the control-stick 120. Accordingly, the electrical conductive material may link the thumb of the user to the touchscreen of the electronic device on which the joystick device 100 may be removably mounted. According to various embodiments, the stem portion 124 of the control-stick 120 and the head portion 122 of the control-stick 120 may be made of electrical conductive material. The electrical conductive material may include conductive metal material. According to various embodiments, the conductive metal material may include brass, or brass with plating, or aluminium, or copper etc.

According to various embodiments, the hollow housing 110 may be configured to be attached to the touchscreen of the electronic device with the control-stick 120 at least substantially perpendicular to the touchscreen. According to various embodiments, a base 118 of the hollow housing 110 (as indicated by a dotted line in FIG. 1A) may be opened. Accordingly, the hollow housing 110 may be free of any base structure and may be empty at the bottom. Hence, the base 118 of the hollow housing 110 may be an opening or an opened mouth that allows access into the internal space 115 of the hollow housing 110. In such a configuration, a bottom end of the endless boundary structure 112 may be provided with an adhesive or an adhesive coating or a tacky coating or suction elements for temporal attachment of the hollow housing 110 of the joystick device 100 to the touchscreen such that the control-stick 120 may be at least substantially perpendicular to the touchscreen. Accordingly, a bottom end of the control-stick 120 (or an end of the control-stick 120 opposite and away from the head portion 122 of the control-stick) may directly contact the touchscreen when the joystick device 100 is attached to the touchscreen. In this manner, the movement of the control-stick 120 along a surface of the touchscreen may be directly sensed or detected by the touchscreen. According to various other embodiments, the base 118 of the hollow housing 110 may be a closed base. Accordingly, the base 118 of the hollow housing 110 may include a film that stretches across a bottom of the endless boundary structure 112, or the base 118 may include a rigid or solid floor structure that covers the bottom of the endless boundary structure 112. In such a configuration, the base 118 of the hollow housing 110 may be configured for attaching to a touchscreen. For example, the base 118 of the hollow housing 110 may be provided with an adhesive or an adhesive coating or a tacky coating or suction elements for temporal attachment of the hollow housing 110 of the joystick device 100 to the touchscreen such that the control-stick 120 may be at least substantially perpendicular to the touchscreen. In this configuration, the base 118 of the hollow housing 110 may create a separation between the bottom end of the control-stick 120 and the touchscreen. However, the base 118 of the hollow housing 110 may be configured to have a suitable thickness such that the touchscreen may still sense and detect the movement of the control-stick 120 through the base 118 when the joystick device 100 is attached to the touchscreen of the electronic device.

Figure 2A:
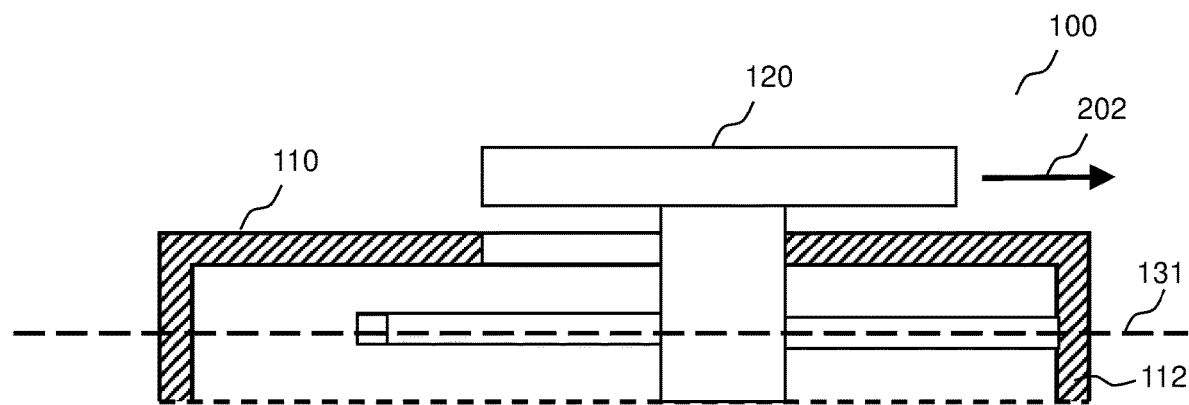
FIG. 2A shows a schematic diagram illustrating a side cut-out view of the joystick device of FIG. 1A when the control-stick of the joystick device is being moved to the right according to various embodiments.
Figure 2B:
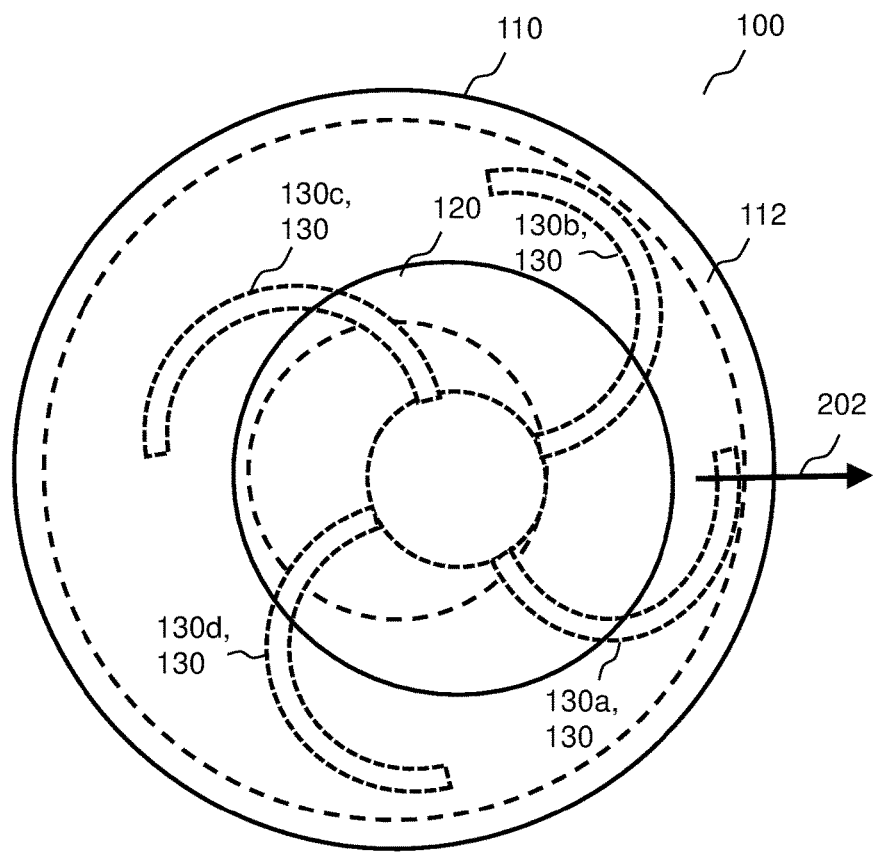
FIG. 2B shows a schematic diagram illustrating a top view of the joystick device of FIG. 2A according to various embodiments.

FIG. 2A shows a schematic diagram illustrating a side cut-out view of the joystick device 100 when the control-stick 120 of the joystick device 100 is being moved to the right according to various embodiments. FIG. 2B shows a schematic diagram illustrating a top view of the joystick device 100 when the control-stick 120 of the joystick device 100 is being moved to the right according to various embodiments. As shown, when the control-stick 120 is being moved towards the right (or the direction as indicated by the arrow 202) relative to the hollow housing 110, one biasing curved arm member 130a of the plurality of biasing curved arm members 130 may be urged against the respective corresponding portion of the endless boundary structure 112 of the hollow housing 110 and be compressed. On the other hand, the remaining others biasing curved arm members 130b, 130c, 130d of the plurality of biasing curved arm members 130 may remain in the respective original state without being subjected to any loading (e.g. compression or tension). The compression on the one biasing curved arm member 130a may cause a biasing force with a tendency to return the compressed biasing curved arm members 130a back to the uncompressed original state to be generated. The biasing force generated in the one biasing curved arm member 130a may move the control-stick 120 back to its initial or original position as the one biasing curved arm member 130a returns to its uncompressed original state once the user release the control-stick 120 so as to release the force compressing the one biasing curved arm member 130a. While it is illustrated that only one of the plurality of biasing curved arm members 130 is being urged and compressed, it is understood that more than one of the plurality of biasing curved arm members 130 may be urged and compressed depending on the direction of movement of the control-stick 120. The respective biasing forces generated may similarly cause the control-stick 120 to return back to its initial or original position.

Figure 3A:
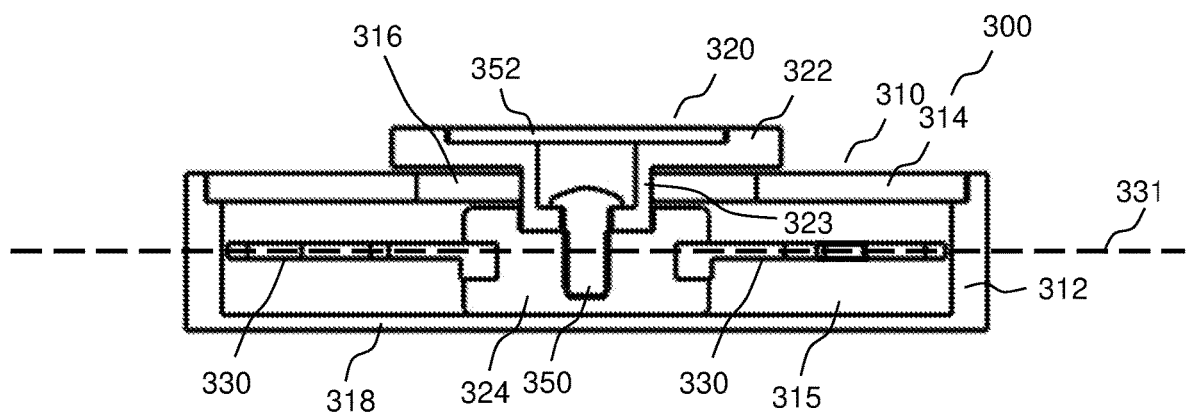
FIG. 3A shows a cross sectional view of a joystick device according to various embodiments.
Figure 3B:
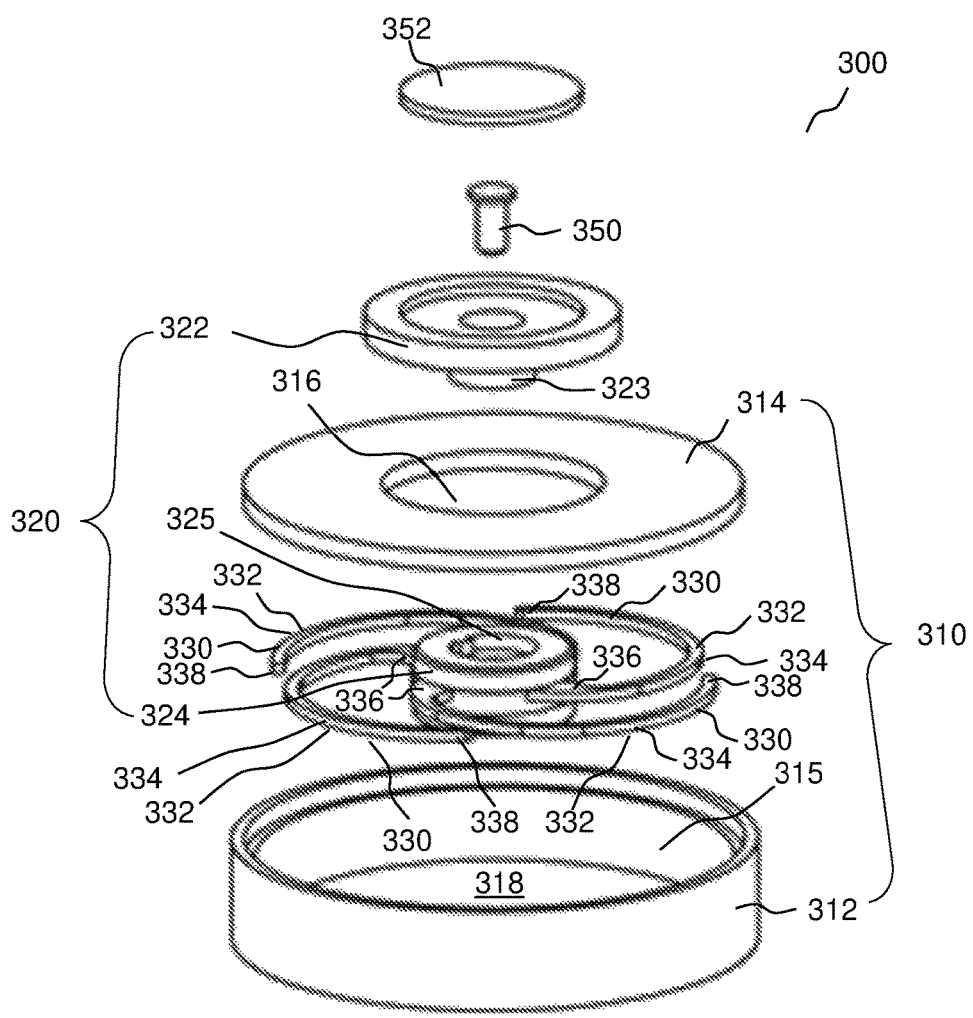
FIG. 3B shows an exploded view of the joystick device of FIG. 3A according to various embodiments.

FIG. 3A shows a cross sectional view of a joystick device 300 according to various embodiments. FIG. 3B shows an exploded view of the joystick device 300 of FIG. 3A according to various embodiments. The joystick device 300 may be configured for a touchscreen. As shown in FIG. 3A and FIG. 3B, the joystick device 300 may, similar to the joystick device 100 of FIG. 1A and FIG. 1B, include a hollow housing 310 formed by an endless boundary structure 312 and a ceiling structure 314 having an opening 316. The endless boundary structure 312 and the ceiling structure 314 may define an internal space 315 of the hollow housing 310. The opening 316 may be through the ceiling structure 314 of the hollow housing 310. As shown, the endless boundary structure 312 may be a circular or an annular side wall. The ceiling structure 314 may be disposed to cover a top end of the endless boundary structure 312. According to various embodiments, the endless boundary structure 312 and the ceiling structure 314 may be separate pieces or separate parts joined together to form the hollow housing 310. According to various embodiments, the endless boundary structure 312 and the ceiling structure 314 may be ultrasonic welded together.

As shown in FIG. 3A and FIG. 3B, the joystick device 300 may, similar to the joystick device 100 of FIG. 1A and FIG. 1B, include a control-stick 320 having a head portion 322 and a stem portion 324. According to various embodiments, the head portion 322 and the stem portion 324 of the control-stick 320 may be two separate parts coupled together to form the control-stick 320. The head portion 322 may include a protrusion 323 on a surface (e.g an underneath surface) and the stem portion 324 may include a recess 325 in an end surface (e.g. a top end surface). The protrusion 323 of the head portion 322 may be inserted into the recess 325 of the stem portion 324 to couple the head portion 322 and the stem portion 324 together, with the ceiling structure 314 sandwiched between the head portion 322 and the stem portion 324. According to various embodiments, a screw 350 may be used to couple or fasten or secure or attach or fix the head portion 322 to the stem portion 324 so as to form the control-stick 320. According to various embodiments, the joystick device 300 may further include a cap 352 (or a screw cap) attached to the head portion 322 of the control-stick 320 to conceal a screw head of the screw 350 which couples the head portion 322 to the stem portion 324.

According to various embodiments, the hollow housing 310 may surround the stem portion 324 of the control-stick 320 such that the control-stick 320 may extend through the opening 316 in the ceiling structure 314 of the hollow housing 310 with the head portion 322 of the control-stick 320 outside the hollow housing 310. Accordingly, the hollow housing 310 may form an enclosure around the stem portion 324 of the control-stick 320, and the stem portion 324 of the control-stick 320 may be extending through the opening 316 in the ceiling structure 314 of the hollow housing 310 such that the head portion 322 of the control-stick 320 may be outside the hollow housing 310.

As shown, according to various embodiments, the stem portion 324 of the control-stick 320 may be cylindrical in shape and the opening 316 of the ceiling structure 314 of the hollow housing 310 may be circular. Accordingly, a diameter of the stem portion 324 of the control-stick 320 may be smaller than a diameter of the opening 316 of the ceiling structure 314 of the hollow housing 310. According to various embodiments, the difference in dimension (e.g. width or diameter) between the stem portion 324 and the opening 316 may provide some leeway or space for the stem portion 324 of the control-stick 320 to move laterally (with respect to the opening 316) within the limit or extent or boundary set by the opening 316 of the ceiling structure 314 of the hollow housing 310.

As also shown, according to various embodiments, the head portion 322 of the control-stick 320 may be in the form of a disc or rounded plate. According to various embodiments, the head portion 322 of the control-stick 320 may have a domed top, or a flat top, or a concave top. According to various embodiments, a dimension (e.g. width or diameter) of the opening 316 of the ceiling structure 314 of the hollow housing 310 may be smaller than a corresponding dimension (e.g. width or diameter) of the head portion 322 of the control-stick 320. Accordingly, the difference in diameters between the head portion 322 and the opening 316 may prevent the head portion 322 of the control-stick 320 from falling into or entering the internal space 315 of the hollow housing 310 via the opening 316 in the ceiling structure 314.

According to various embodiments, a length of the stem portion 324 of the control-stick 320 may be longer than a height of the endless boundary structure 312 of the hollow housing 310. Accordingly, the head portion 322 of the control-stick 320 may remain outside the hollow housing 310 when the stem portion 324 of the control-stick 320 is inserted into the hollow housing 310 via the opening 316 of the ceiling structure 314 of the hollow housing 310.

As shown in FIG. 3A and FIG. 3B, the joystick device 300 may, similar to the joystick device 100 of FIG. 1A and FIG. 1B, include a plurality of biasing curved arm members 330 extending outwardly from the stem portion 324 of the control-stick 320 in a manner so as to be movable with the control-stick 320 as a whole relative to the hollow housing 310 along a plane 331 at least substantially perpendicular to the stem portion 324 of the control-stick 320. Accordingly, the plurality of biasing curved arm members 330 may form a radial arrangement around the stem portion 324 of the control-stick 320. The plurality of biasing curved arm members 330 may be integrated with the stem portion 324 of the control-stick 320 such that the plurality of biasing curved arm members 330 and the control-stick 320 together constitute a single part or a single unit. Thus, the plurality of biasing curved arm members 330 may be moved together with the control-stick 320 as a whole in a same motion and/or same direction when the control-stick 320 is being moved. On the other hand, the hollow housing 310 may be a separate part or a separate unit such that the hollow housing 310 is not attached or fastened or joined or secured or fixed or connected to the control-stick 320 and/or the plurality of biasing curved arm members 330 in anyway. Accordingly, the control-stick 320 and the plurality of biasing curved arm members 330 may not be attached or fastened or joined or secured or fixed or connected to the hollow housing 310 (or may be unattached or unconnected or disjointed with the hollow housing 310, or may be free from being attached or fastened or joined or secured or fixed or connected to the hollow housing 310). Accordingly, the control-stick 320 and the plurality of biasing curved arm members 330 may be a first part of the joystick device 300 while the hollow housing 310 may be a separate second part of the joystick device 300 such that the first and second part of the joystick device 300 may be separate parts or disjointed parts or independent parts which are movable relative to each other. According to various embodiments, the plurality of biasing curved arm members 330 and the control-stick 320 may be movable laterally as a whole relative to the hollow housing 310 along the plane 331. According to various embodiments, the plurality of biasing curved arm members 330 and the control-stick 320 may be rotatable as a whole relative to the hollow housing 110 about a longitudinal axis of the control-stick 320.

According to various embodiments, each of the plurality of biasing curved arm members 330 may extend from the stem portion 324 of the control-stick 320 along the plane 331 and has a curved segment 332 with a convex side 334 of the curved segment 332 directed towards a respective corresponding portion of the endless boundary structure 312 of the hollow housing 310 so as to bias the stem portion 324 of the control-stick 320 away from the respective corresponding portion of the endless boundary structure 312 of the hollow housing 310 when the control-stick 320 is being moved towards the respective corresponding portion of the endless boundary structure 312 of the hollow housing 310. According to various embodiments, the curved segment 332 of each of the plurality of biasing curved arm members 330 may be loosely abutting the respective corresponding portion of the endless boundary structure 312 of the hollow housing 310 such that the convex side 334 of the curved segment 332 may contact the respective corresponding portion of the endless boundary structure 312 of the hollow housing 310 for biasing when the control-stick 320 is being moved towards the respective corresponding portion of the endless boundary structure 312 of the hollow housing 310, and the convex side 334 of the curved segment 332 may be moved away or apart from the respective corresponding portion of the endless boundary structure 312 of the hollow housing 310 when the control-stick 320 is being moved in an opposite direction away from the respective corresponding portion of the endless boundary structure 312 of the hollow housing 310.

According to various embodiments, moving the control-stick 320 towards the respective corresponding portion of the endless boundary structure 312 of the hollow housing 310 may compress the respective biasing curved arm member 330 as the respective biasing curved arm member 330 is being urged against the respective corresponding portion of the endless boundary structure 312 of the hollow housing 310. According to various embodiments, the plurality of biasing curved arm members 330 may be made of resilient material. Accordingly, compressing the respective biasing curved arm members 330 may cause the respective biasing curved arm members 330 to generate a biasing force with a tendency to return the respective biasing curved arm members 330 back to the uncompressed original state which may move the control-stick 320 back to its initial or original position once the user release the control-stick 320. On the other hand, since the plurality of biasing curved arm members 330 may not be attached or fastened or joined or secured or fixed or connected to the hollow housing 310 (or may be unattached or unconnected or disjointed with the hollow housing 310, or may be free from being attached or fastened or joined or secured or fixed or connected to the hollow housing 310), when the control-stick 320 is being moved in an opposite direction away from the respective corresponding portion of the endless boundary structure 312 of the hollow housing 310, the respective biasing curved arm member 330 may remain in its original state without being subjected to any loading, such as tension. Accordingly, each of the plurality of biasing curved arm members 330 may only be subjected to compression forces when being urged against the respective corresponding portion of the endless boundary structure 312 of the hollow housing 310 as the control-stick 320 is being moved towards the respective corresponding portion of the endless boundary structure 312 of the hollow housing 310.

According to various embodiments, each of the plurality of biasing curved arm members 330 may be in the form of a stripe of resilient material extending from the stem portion 324 of the control-stick 320 along the plane 331. The stripe of resilient material may extend into a curve having an outline that bends continuously. According to various embodiments, each of the plurality of biasing curved arm members 330 may include a first end 336 integral to the stem portion 324 of the control-stick 320 and a second free-end 338. Accordingly, each of the plurality of biasing curved arm members 330 may extend from the stem portion 324 of the control-stick 320 via the respective first end 336 in a continual or unbroken or uninterrupted manner. Further, the second free-end 338 of each of the plurality of biasing curved arm members 330 may be relatively unrestricted (or unrestrained) and free from being attached or fastened or joined or secured or fixed or connected or confined or bound to any structure.

According to various embodiments, the plurality of biasing curved arm members 330 may curve in the same direction. For example, as shown in FIG. 3A and FIG. 3B, the plurality of biasing curved arm members 330 may curve in a counter-clockwise direction. According to various other embodiments, the plurality of biasing curved arm members 330 may curve in a clock-wise direction. According to various embodiments, the plurality of biasing curved arm members 330 may have the same curvature.

According to various embodiments, the plurality of biasing curved arm members 330 may be distributed along a circumference of the stem portion 324 of the control-stick 320 in a manner so as to cooperate with each other to centre the control-stick 320 with respect to the opening 316 of the ceiling 314 of the hollow housing 310. Accordingly, the plurality of biasing curved arm members 330 may be efficiently dispersed or spread around the stem portion 324 of the control-stick 320 such that, regardless of whichever radial direction the control-stick 320 is being moved relative to the opening 316 of the ceiling 314 of the hollow housing 310, one or more of the plurality of biasing curved arm members 330 may bias the control-stick 320 in the opposite direction so as to provide a biasing force to return the control-stick 320 to its original or initial position. According to various embodiments, the original or initial position of the control-stick 320 may be the centre of the opening 316 of the ceiling 314 of the hollow housing 310.

According to various embodiments, the plurality of biasing curved arm members 330 may include two or three or four or more biasing curved arm members 330 forming a radial arrangement around the stem portion 324 of the control-stick 320. As shown, according to various embodiments, the plurality of biasing curved arm members 330 may include four biasing curved arm members 330 forming a quatrefoil-like shape around the stem portion 324 of the control-stick 320. The quatrefoil-like shape formed by the four biasing curved arm members 330 may provide an effective and efficient radial arrangement to centre the control-stick 320 with respect to the opening 316 of the ceiling 314 of the hollow housing 310 when the opening 116 is located at the centre of the ceiling 314.

According to various embodiments, the dimension (e.g. width or diameter) of the opening 316 of the ceiling structure 314 of the hollow housing 310 may be smaller than a corresponding dimension (e.g. width or diameter) of the radial arrangement formed by the plurality of biasing curved arm members 330 around the stem portion 324 of the control-stick 320. Accordingly, the difference in dimensions between the opening 316 and the radial arrangement may prevent the control-stick 320 from being pulled out or drawn out of the internal space 315 of the hollow housing 310 via the opening 316 in the ceiling structure 314.

According to various embodiments, the hollow housing 310 may be configured to be attached to the touchscreen of the electronic device with the control-stick 320 at least substantially perpendicular to the touchscreen. According to various embodiments, a base 318 of the hollow housing 310 may be a closed base as shown. Accordingly, the base 318 of the hollow housing 310 may include a film that stretches across a bottom of the endless boundary structure 312 of the hollow housing 310, or the base 318 may include a rigid or solid floor structure that covers the bottom of the endless boundary structure 312 of the hollow housing 310. In such a configuration, the base 318 of the hollow housing 310 may be configured for attaching to a touchscreen. For example, the base 318 of the hollow housing 310 may be provided with an adhesive or an adhesive coating or a tacky coating or suction elements for temporal attachment of the hollow housing 310 of the joystick device 300 to the touchscreen such that the control-stick 320 may be at least substantially perpendicular to the touchscreen. In this configuration, the base 318 of the hollow housing 310 may create a separation between the bottom end of the control-stick 320 and the touchscreen. However, the base 318 of the hollow housing 310 may be configured to have a suitable thickness such that the touchscreen may still sense and detect the movement of the control-stick 320 through the base 318 when the joystick device 300 is attached to the touchscreen of the electronic device.

Figure 3C:
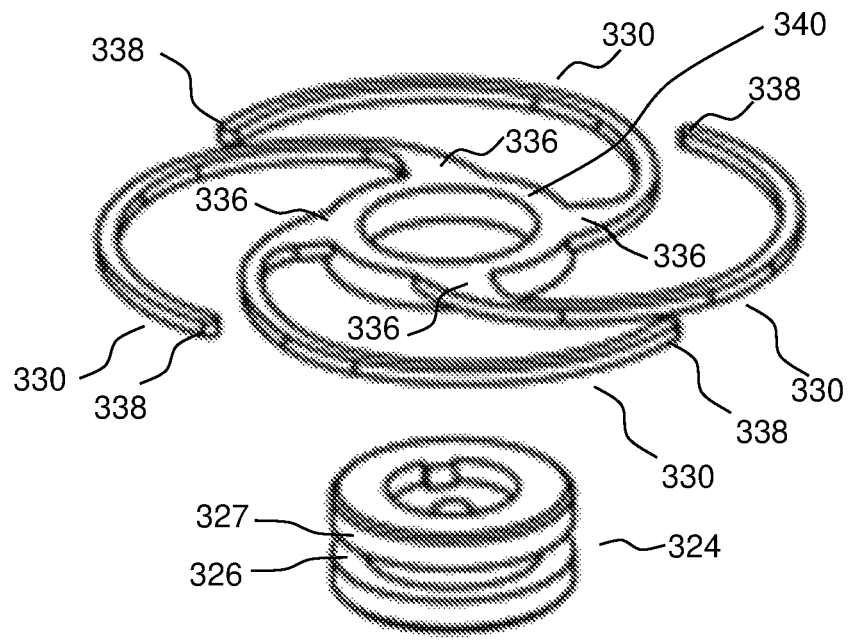
FIG. 3C shows an exploded view of a stem portion of a control stick with a plurality of biasing curved arm members of the joystick device of FIG. 3A according to various embodiments.
Figure 3D:
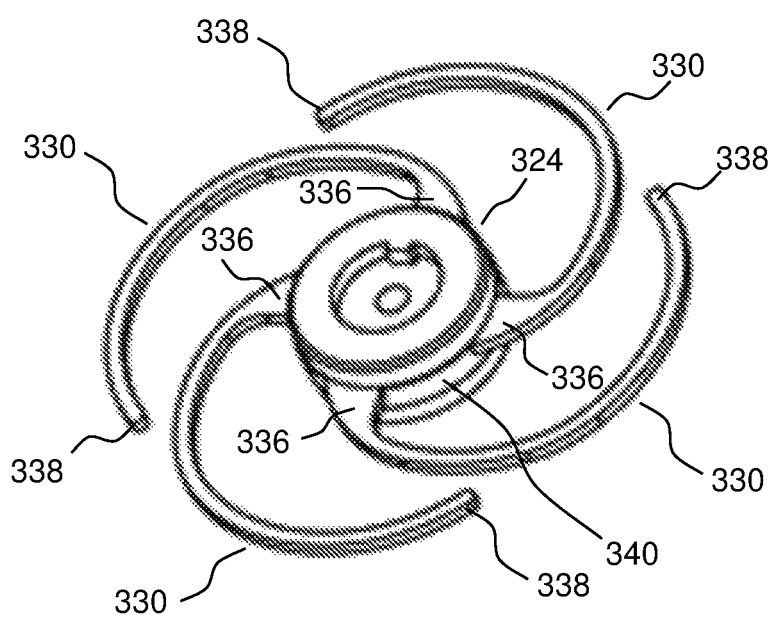
FIG. 3D shows an assembled view of the stem portion of the control stick with the plurality of biasing curved arm members of FIG. 3C according to various embodiments.

FIG. 3C shows an exploded view of the stem portion 324 with the plurality of biasing curved arm members 330 of the joystick device 300 of FIG. 3A according to various embodiments. FIG. 3D shows an assembled view of the stem portion 324 with the plurality of biasing curved arm members 330 of FIG. 3C according to various embodiments. As shown, according to various embodiments, the stem portion 324 of the control-stick 320 may include an endless groove 326 around a cylindrical surface 327 of the stem portion 324 of the control-stick 320. The endless groove 326 may be disposed circumferentially around the stem portion 324 of the control-stick 320 along the plane 331. Accordingly, the endless groove 326 may be a continuous groove encircling the cylindrical surface 327 of the stem portion 324 of the control-stick 320.

According to various embodiments, the joystick device 300 may include a ring 340 from which each of the plurality of biasing curved arm members 330 may extend. According to various embodiments, the ring 340 may be insert moulded into the endless groove 326 of the stem portion 324 of the control-stick 320 such that the plurality of biasing curved arm members 330 may be integral with the stem portion 324 of the control-stick 320 (as shown in FIG. 3D) in order for the plurality of biasing curved arm members 330 to extend from the stem portion 324 of the control-stick 320 along the plane 331.

As shown in FIG. 3C and FIG. 3D, according to various embodiments, the ring 340 and the plurality of biasing curved arm members 330 may be a one-piece structure. Accordingly, the plurality of biasing curved arm members 330 may be integrally moulded with the ring 340 during the insert moulding process. Accordingly, the ring 340 and the plurality of biasing curved arm members 330 may be moulded into the endless groove 326 of the stem portion 324 of the control-stick 320 such that the ring 340, the plurality of biasing curved arm members 330 and the stem portion 324 of the control-stick 320 may become a single part or single unit.

According to various embodiments, the first end 336 of each of the plurality of biasing curved arm members 330 may be integral to the ring 340, which in turn may be integral to the stem portion 324 of the control-stick 320. Accordingly, each of the plurality of biasing curved arm members 330 may extend from the ring 340 via the respective first end 336 in a continual or unbroken or uninterrupted manner. As shown, each of the plurality of biasing curved arm members 330 may include a second free-end 338. The second free-end 338 of each of the plurality of biasing curved arm members 330 may be relatively unrestricted (or unrestrained) and free from being attached or fastened or joined or secured or fixed or connected or confined or bound to any structure.

According to various embodiments, the control-stick 320 may be made of electrical conductive material such that the touchscreen of the electronic device may sense or detect the movement of the control-stick 320. Accordingly, the stem portion 324 of the control-stick 320 and the head portion 322 of the control-stick 320 may be made of electrical conductive material. According to various embodiments, the cap 352, which is attached to the head portion 322 of the control-stick 320 for concealing the screw head of the screw 350, may be made of electrical conductive material. According to various embodiments, the screw 350, which couples the head portion 322 to the stem portion 324, may be made of electrical conductive material. According to various embodiments, the electrical conductive material may include conductive metal material.

According to various embodiments, the ring 340 and the plurality of biasing curved arm members 330 may be made of electrical insulating material. According to various embodiments, the electrical insulating material may include plastic material which may be suitable for insert moulding and which may be resilient. According to various embodiments, the electrical insulating material may include polypropylene.

Figure 4A:
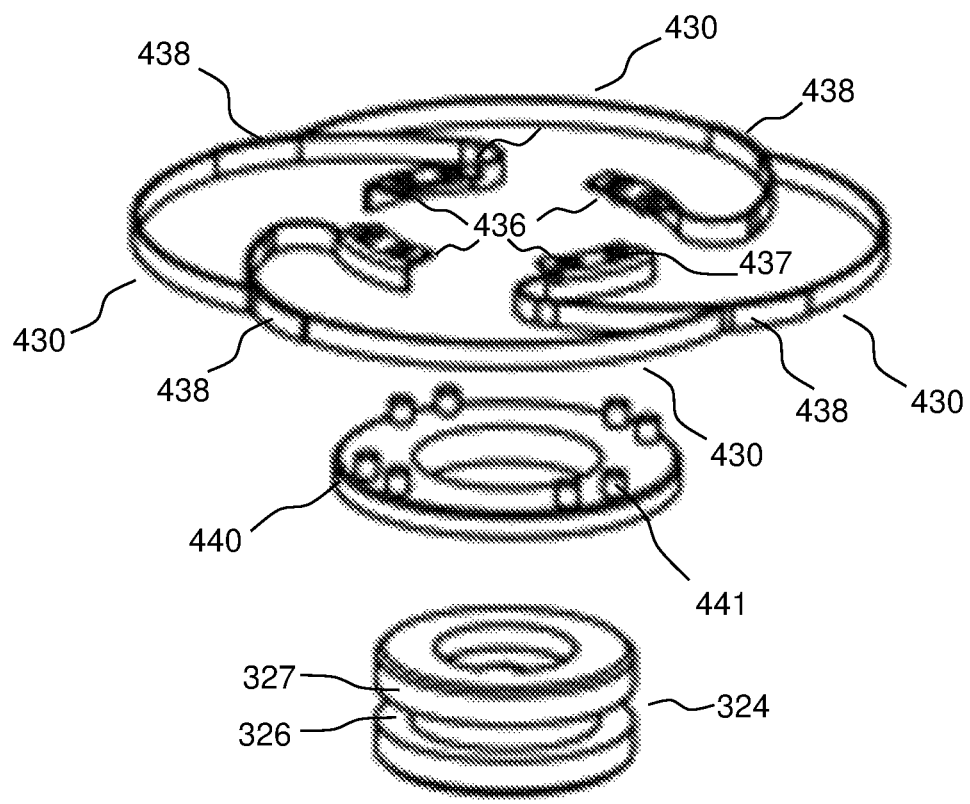
FIG. 4A shows an exploded view of a stem portion of a control stick with a variant of a plurality of biasing curved arm members according to various embodiments.
Figure 4B:
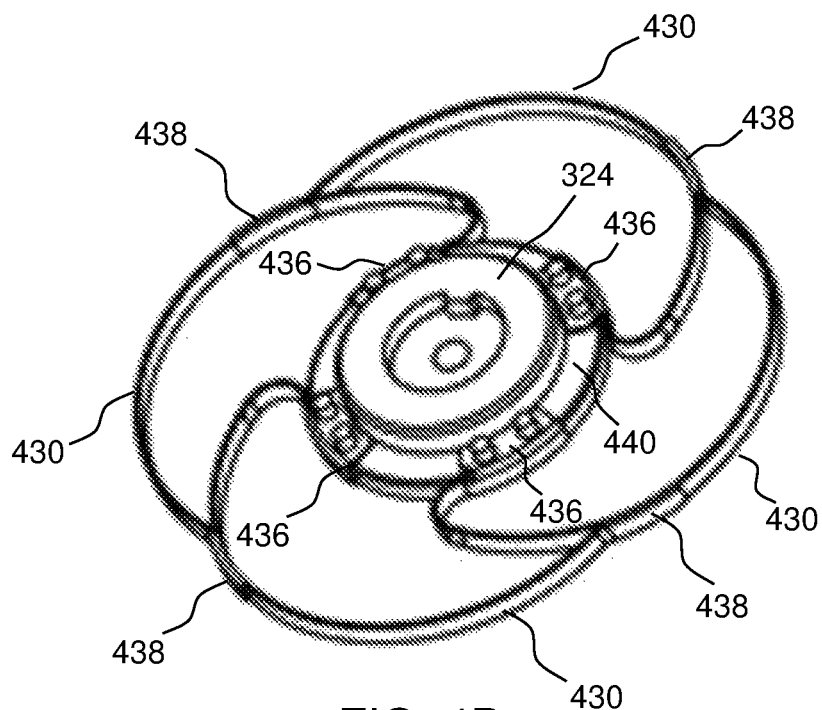
FIG. 4B shows an assembled view of the stem portion with the variant of the plurality of biasing curved arm members of FIG. 4A according to various embodiments.

FIG. 4A shows an exploded view of the stem portion 324 with a variant of a plurality of biasing curved arm members 430 according to various embodiments. FIG. 4B shows an assembled view of the stem portion 324 with the variant of the plurality of biasing curved arm members 430 of FIG. 4A according to various embodiments. According to various embodiments, the stem portion 324 with the variant of the plurality of biasing curved arm members 430 of FIG. 4A and FIG. 4B may be used to replace the stem portion 324 with the plurality of biasing curved arm members 330 of FIG. 3C and FIG. 3D in the joystick device 300 of FIG. 3A and FIG. 3B. Referring to FIG. 3B, the stem portion 324 with the plurality of biasing curved arm members 330 may be swapped or substituted or replaced or switched or changed with the stem portion 324 having the variant of the plurality of biasing curved arm members 430 of FIG. 4A and FIG. 4B. The remaining components of the joystick device 300 in FIG. 3B may remain the same.

As shown in FIGS. 4A and 4B, according to various embodiments, the stem portion 324 may, similar to the stem portion 324 as shown in FIG. 3C and FIG. 3D, include an endless groove 326 around a cylindrical surface 327 of the stem portion 324. According to various embodiments, a ring 440 may be provided. Each of the plurality of biasing curved arm members 430 may extend from the ring 440. According to various embodiments, the ring 440 may be insert moulded into the endless groove 326 of the stem portion 324 of the control-stick 320 such that the ring 440 may be integral with the stem portion 324 of the control-stick 320. According to various embodiments, the ring 440 may protrude from the cylindrical surface 327 of the stem portion 324 forming a projecting rim or collar, resembling a flange, around the stem portion 324 along the plane 331.

According to various embodiments, the ring 440 and the plurality of biasing curved arm members 430 may be separate parts coupled together such that each of the plurality of biasing curved arm members 430 may extend from the ring 440. With the ring 440 insert moulded into the endless groove 326 of the stem portion 324, the plurality of biasing curved arm members 430 may then extend from the stem portion 324 of the control-stick 320 along the plane 331.

According to various embodiments, a first end 436 of each of the plurality of biasing curved arm members 430 may be coupled to the ring 440. According to various embodiments, the ring 440 and the plurality of biasing curved arm members 436 may be attached to each other via a heat staking process. As shown, the ring 440 may include one or more studs 441 for fitting through one or more corresponding holes 437 at the first end 436 of each of the plurality of biasing curved arm members 430. Upon fitting the one or more studs 441 through the one or more corresponding holes 437, heat staking may be applied to melt and deform the one or more studs 441 so as to form one or more heads to mechanically lock each of the plurality of biasing curved arm members 430 to the ring 440. According to various embodiments, a second end 438 of each of the plurality of biasing curved arm members 430 may be coupled to an adjacent biasing curved arm member 430. According to various embodiments, the second end 438 of each of the plurality of biasing curved arm members 430 may be coupled to a forward segment of the adjacent biasing curved arm member 430, wherein the forward segment is between the first end 436 and a mid-point of the adjacent biasing curved arm member 430. Accordingly, the plurality of biasing curved arm members 430 may be interconnected to each other via the respective second end 438.

According to various embodiments, the ring 440 may be made of electrical insulating material. According to various embodiments, the electrical insulating material may include plastic material which may be suitable for insert moulding. According to various embodiments, the electrical insulating material may include polypropylene. According to various embodiments, the plurality of biasing curved arm members 430 may be made of metal, such as SUS301, phosphor bronze, beryllium copper etc. Accordingly, the plurality of biasing curved arm members 430 may serve as metal spring.

Figure 5:
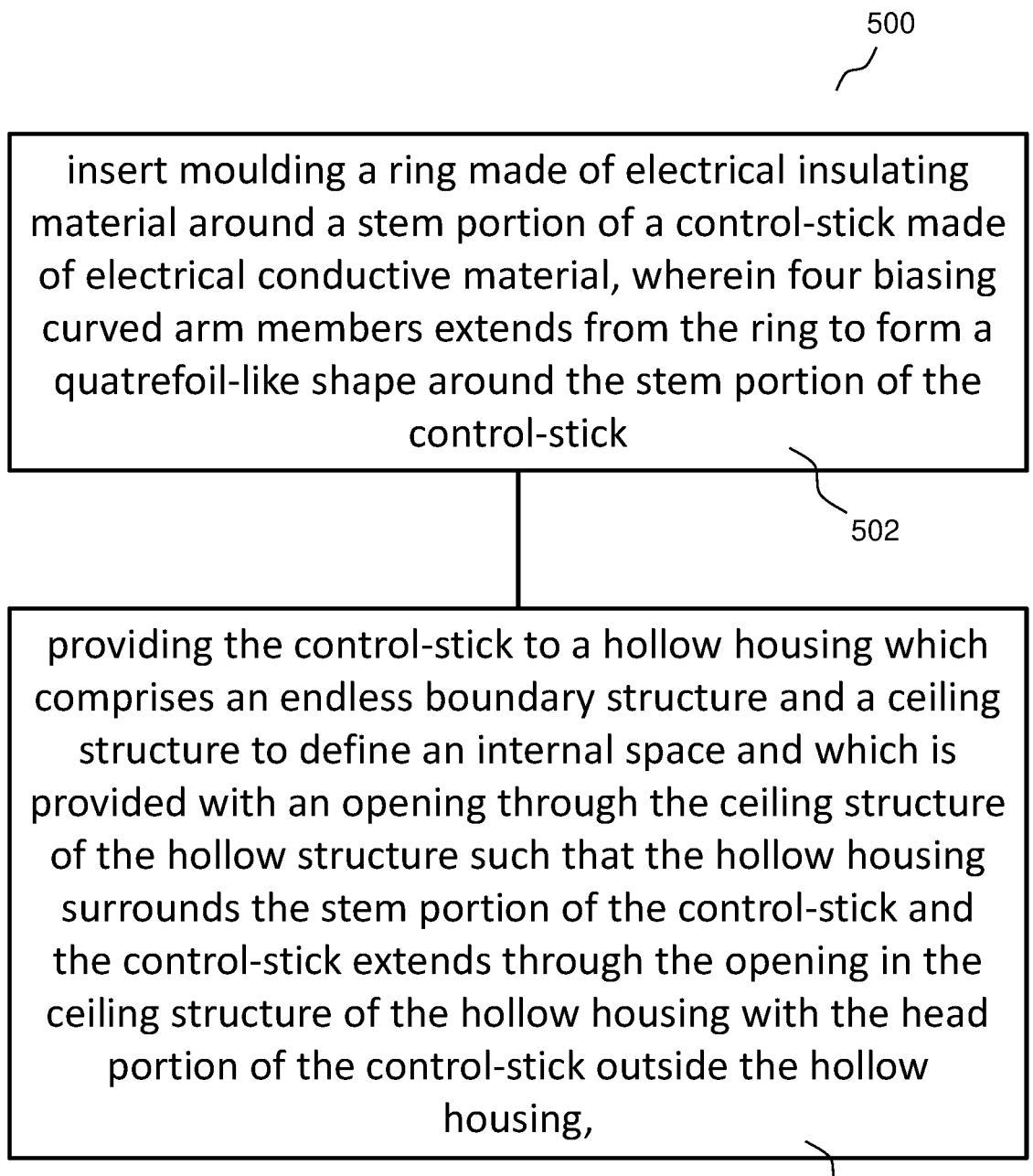
FIG. 5 shows a schematic diagram of a method of manufacturing a joystick device according to various embodiments.

FIG. 5 shows a schematic diagram of a method 500 of manufacturing a joystick device according to various embodiments. At 502, the method 500 may include insert moulding a ring made of electrical insulating material around a stem portion of a control-stick made of electrical conductive material, wherein four biasing curved arm members extends from the ring to form a quatrefoil-like shape around the stem portion of the control-stick. At 504, the method 500 may include providing the control-stick to a hollow housing which includes an endless boundary structure and a ceiling structure to define an internal space and which is provided with an opening through the ceiling structure of the hollow structure such that the hollow housing surrounds the stem portion of the control-stick and the control-stick extends through the opening in the ceiling structure of the hollow housing with the head portion of the control-stick outside the hollow housing. According to various embodiments, the four biasing curved arm members and the control-stick may be movable as a whole relative to the hollow housing along a plane at least substantially perpendicular to the stem portion of the control-stick. Each of the four biasing curved arm members may extend from the ring along the plane and may have a curved segment with a convex side of the curved segment directed towards a respective corresponding portion of the endless boundary structure of the hollow housing so as to bias the stem portion of the control-stick away from the respective corresponding portion of the endless boundary structure of the hollow housing when the control-stick is being moved towards the respective corresponding portion of the endless boundary structure. According to various embodiments, the four biasing curved arm members may be distributed along a circumference of the stem portion of the control-stick in a manner so as to cooperate with each other to centre the control-stick with respect to the opening of the ceiling of the hollow housing.

According to various embodiments, the stem portion of the control-stick may include an endless groove around a cylindrical surface of the stem portion of the control-stick. Accordingly, the insert moulding of the ring around the stem portion of the control-stick at 502 may include insert moulding the ring into the endless groove of the stem portion of the control-stick.

Referring to FIG. 3C and FIG. 3D, according to various embodiments, the insert moulding of the ring around the stem portion of the control-stick at 502 may include integrally moulding the four biasing curved arm members with the ring.

Referring to FIG. 4A and FIG. 4B, according to various embodiments, the method 500 may further include coupling the four biasing curved arm members to the ring via a heat staking process.

Referring to FIG. 3A and FIG. 3B, according to various embodiments, providing the control-stick to a hollow housing at 504 may include (i) placing the stem portion with the four biasing curved arm members within the endless boundary structure of the hollow housing, (ii) coupling the ceiling structure of the hollow housing to the endless boundary structure of the hollow housing, and (iii) coupling the head portion of the control-stick to the stem portion of the control-stick. According to various embodiments, the coupling of the head portion of the control-stick to the stem portion of the control-stick in (iii) above may include fitting a protrusion of the head portion into a recess of the stem portion, coupling the head portion to the stem portion via a screw, and placing a cap on the head portion to conceal a screw head of the screw.

The following examples pertain to various embodiments.

Example 1 is a joystick device including:

a hollow housing formed by an endless boundary structure and a ceiling structure having an opening;

a control-stick having a head portion and a stem portion, the hollow housing surrounding the stem portion of the control-stick such that the control-stick extends through the opening in the ceiling structure of the hollow housing with the head portion of the control-stick outside the hollow housing; and a plurality of biasing curved arm members extending outwardly from the stem portion of the control-stick in a manner so as to be movable with the control-stick relative to the hollow housing along a plane at least substantially perpendicular to the stem portion, wherein each of the plurality of biasing curved arm members extends from the stem portion along the plane and has a curved segment with a convex side of the curved segment directed towards a respective corresponding portion of the endless boundary structure of the hollow housing so as to bias the stem portion of the control-stick away from the respective corresponding portion of the endless boundary structure of the hollow housing when the control-stick is being moved towards the respective corresponding portion of the endless boundary structure, wherein the plurality of biasing curved arm members and the control-stick are movable as a whole relative to the hollow housing along the plane, and wherein the plurality of biasing curved arm members are distributed along a circumference of the stem portion of the control-stick in a manner so as to cooperate with each other to centre the control-stick with respect to the opening of the ceiling of the hollow housing.

In Example 2, the subject matter of Example 1 may optionally include that the plurality of biasing curved arm members may include four biasing curved arm members forming a quatrefoil-like shape around the stem portion of the control-stick.

In Example 3, the subject matter of Example 1 or 2 may optionally include that the stem portion of the control-stick may include an endless groove around a cylindrical surface of the stem portion of the control-stick.

In Example 4, the subject matter of Example 3 may optionally include a ring from which each of the plurality of biasing curved arm members may extend, wherein the ring may be insert moulded into the endless groove of the stem portion of the control-stick.

In Example 5, the subject matter of Example 4 may optionally include that the plurality of biasing curved arm members is integrally moulded with the ring.

In Example 6, the subject matter of Example 5 may optionally include that each of the plurality of biasing curved arm members may include a first end integral to the ring and a second free-end.

In Example 7, the subject matter of Example 5 or 6 may optionally include that the ring and the plurality of biasing curved arm members may be made of electrical insulating material.

In Example 8, the subject matter of Example 4 may optionally include that the ring and the plurality of biasing curved arm members may be separate parts coupled together such that each of the plurality of biasing curved arm members may extend from the ring.

In Example 9, the subject matter of Example 8 may optionally include that each of the plurality of biasing curved arm members may have a first end coupled to the ring and a second end coupled to an adjacent biasing curved arm member.

In Example 10, the subject matter of Example 8 or 9 may optionally include that the ring may be made of electrical insulating material and the plurality of biasing curved arm members may be made of metal.

In Example 11, the subject matter of Example 10 may optionally include that the ring and the plurality of biasing curved arm members may be attached to each other via a heat staking process.

In Example 12, the subject matter of any one of Examples 1 to 11 may optionally include that the stem portion of the control-stick and the head portion of the control-stick may be made of electrical conductive material.

In Example 13, the subject matter of any one of Examples 1 to 12 may optionally include that a bottom end of the stem portion of the control-stick may contact a touchscreen of an electronic device when the joystick device is placed on top of the electronic device. Accordingly, the hollow housing may be configured to be attached to a touchscreen with the control-stick at least substantially perpendicular to the touchscreen, wherein movement of the control-stick along the plane may be detectable by the touchscreen.

In Example 14, the subject matter of any one of Examples 1 to 13 may optionally include that the stem portion and the head portion of the control-stick may be two separate parts coupled together in a manner in which a protrusion of the head portion may be inserted into a recess in an end surface of the stem portion to form the control-stick.

In Example 15, the subject matter of Example 14 may optionally include that the stem portion and the head portion of the control-stick may be coupled via a screw.

In Example 16, the subject matter of Example 15 may optionally include a cap made of electrical conductive material attached to the head portion of the control-stick to conceal a screw head of the screw which couples the head portion to the stem portion.

Example 17 is a joystick device including:

a hollow housing which includes an endless boundary structure and a ceiling structure to define an internal space, and which is provided with an opening through the ceiling structure;

a control-stick having a head portion and a stem portion extending through the opening of the ceiling structure, the hollow housing surrounding the stem portion of the control-stick with the head portion of the control-stick outside the hollow housing, wherein the control-stick is made of electrical conductive material;

a ring made of electrical insulating material fixedly coupled around the stem portion of the control-stick; and a plurality of biasing curved arm members extending from the ring to form a radial arrangement around the stem portion of the control-stick in a manner so as to be movable with the control-stick as a whole relative to the hollow housing along a plane at least substantially perpendicular to the stem portion, wherein each of the plurality of biasing curved arm members extends from the ring along the plane and has a curved segment with a convex side of the curved segment directed towards a respective corresponding portion of the endless boundary structure of the hollow housing so as to bias the stem portion of the control-stick away from the respective corresponding portion of the endless boundary structure of the hollow housing when the control-stick is being moved towards the respective corresponding portion of the endless boundary structure, wherein the plurality of biasing curved arm members are distributed along a circumference of the stem portion of the control-stick in a manner so as to cooperate with each other to centre the control-stick with respect to the opening of the ceiling of the hollow housing.

In Example 18, the subject matter of Example 17 may optionally include that the stem portion of the control-stick may include an endless groove around a cylindrical surface of the stem portion of the control-stick, and wherein the ring may be insert moulded into the endless groove of the stem portion of the control-stick.

In Example 19, the subject matter of Example 17 or 18 may optionally include that the plurality of biasing curved arm members may be integrally moulded with the ring.

In Example 20, the subject matter of Example 19 may optionally include that each of the plurality of biasing curved arm members may include a first end integral to the ring and a second free-end.

In Example 21, the subject matter of Example 20 may optionally include that the plurality of biasing curved arm members may be made of polypropylene.

In Example 22, the subject matter of Example 17 or 18 may optionally include that the ring and the plurality of biasing curved arm members may be separate parts coupled together such that each of the plurality of biasing curved arm members may extend from the ring.

In Example 23, the subject matter of Example 22 may optionally include that each of the plurality of biasing curved arm members may have a first end coupled to the ring and a second end coupled to an adjacent biasing curved arm member.

In Example 24, the subject matter of Example 22 or 23 may optionally include that the plurality of biasing curved arm members may be made of metal.

In Example 25, the subject matter of any one of Examples 22 to 24 may optionally include that the ring and the plurality of biasing curved arm members may be coupled via a heat staking process.

In Example 26, the subject matter of any one of Examples 17 to 25 may optionally include that the hollow housing may be configured to be attached to a touchscreen with the control-stick at least substantially perpendicular to the touchscreen, wherein movement of the control-stick may be detectable by the touchscreen.

Example 27 is a method of manufacturing a joystick device, the method including:

insert moulding a ring made of electrical insulating material around a stem portion of a control-stick made of electrical conductive material, wherein four biasing curved arm members extends from the ring to form a quatrefoil-like shape around the stem portion of the control-stick; and providing the control-stick to a hollow housing which includes an endless boundary structure and a ceiling structure to define an internal space and which is provided with an opening through the ceiling structure of the hollow structure such that the hollow housing surrounds the stem portion of the control-stick and the control-stick extends through the opening in the ceiling structure of the hollow housing with the head portion of the control-stick outside the hollow housing, wherein the four biasing curved arm members and the control-stick are movable as a whole relative to the hollow housing along a plane at least substantially perpendicular to the stem portion of the control-stick, wherein each of the four biasing curved arm members extends from the ring along the plane and has a curved segment with a convex side of the curved segment directed towards a respective corresponding portion of the endless boundary structure of the hollow housing so as to bias the stem portion of the control-stick away from the respective corresponding portion of the endless boundary structure of the hollow housing when the control-stick is being moved towards the respective corresponding portion of the endless boundary structure, wherein the four biasing curved arm members are distributed along a circumference of the stem portion of the control-stick in a manner so as to cooperate with each other to centre the control-stick with respect to the opening of the ceiling of the hollow housing.

In Example 28, the subject matter of Example 27 may optionally include that the stem portion of the control-stick may include an endless groove around a cylindrical surface of the stem portion of the control-stick. Further, the insert moulding of the ring around the stem portion of the control-stick may include insert moulding the ring into the endless groove of the stem portion of the control-stick.

In Example 29, the subject matter of Example 27 or 28 may optionally include that the insert moulding of the ring around the stem portion of the control-stick may include integrally moulding the four biasing curved arm members with the ring.

In Example 30, the subject matter of Example 27 or 28 may optionally include coupling the four biasing curved arm members to the ring via a heat staking process.

Various embodiments have provided a joystick device and a method of manufacturing thereof which are simple and easy to implement solution for providing tactile feel to enhance the mobile gaming experience. Further, the joystick device has been carefully considered to provide a reliable and durable solution.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. A joystick device comprising:
   a hollow housing formed by an endless boundary structure and a ceiling structure having an opening;
   a control-stick having a head portion and a stem portion, the hollow housing surrounding the stem portion of the control-stick such that the control-stick extends through the opening in the ceiling structure of the hollow housing with the head portion of the control-stick outside the hollow housing; and
   a plurality of biasing curved arm members extending outwardly from the stem portion of the control-stick in a manner so as to be movable with the control-stick relative to the hollow housing along a plane at least substantially perpendicular to the stem portion, wherein each of the plurality of biasing curved arm members extends from the stem portion along the plane and has a curved segment with a convex side of the curved segment directed towards a respective corresponding portion of the endless boundary structure of the hollow housing so as to bias the stem portion of the control-stick away from the respective corresponding portion of the endless boundary structure of the hollow housing when the control-stick is being moved towards the respective corresponding portion of the endless boundary structure,
   wherein the plurality of biasing curved arm members are movable with the control-stick as a whole relative to the hollow housing along the plane, and
   wherein the plurality of biasing curved arm members are distributed along a circumference of the stem portion of the control-stick in a manner so as to cooperate with each other to centre the control-stick with respect to the opening of the ceiling of the hollow housing.

2. The joystick device of claim 1, wherein the plurality of biasing curved arm members comprises four biasing curved arm members forming a quatrefoil-like shape around the stem portion of the control-stick.

3. The joystick device of claim 1, further comprising a ring from which each of the plurality of biasing curved arm members extends, wherein the ring is insert moulded into an endless groove around a cylindrical surface of the stem portion of the control-stick.

4. The joystick device of claim 3, wherein the plurality of biasing curved arm members is integrally moulded with the ring, wherein each of the plurality of biasing curved arm members comprises a first end integral to the ring and a second free-end.

5. The joystick device of claim 3, wherein the ring and the plurality of biasing curved arm members are separate parts coupled together such that each of the plurality of biasing curved arm members extends from the ring.

6. The joystick device of claim 5, wherein each of the plurality of biasing curved arm members has a first end coupled to the ring and a second end coupled to an adjacent biasing curved arm member.

7. The joystick device of claim 5, wherein the ring is made of electrical insulating material and the plurality of biasing curved arm members is made of metal.

8. The joystick device of claim 1, wherein the stem portion and the head portion of the control-stick are two separate parts coupled together in a manner in which a protrusion of the head portion is inserted into a recess in an end surface of the stem portion to form the control-stick.

9. The joystick device of claim 8, further comprising a cap made of electrical conductive material attached to the head portion of the control-stick to conceal a screw head of a screw which couples the head portion to the stem portion.

10. A joystick device comprising:
    a hollow housing which comprises an endless boundary structure and a ceiling structure to define an internal space, and which is provided with an opening through the ceiling structure;
    a control-stick having a head portion and a stem portion extending through the opening of the ceiling structure, the hollow housing surrounding the stem portion of the control-stick with the head portion of the control-stick outside the hollow housing, wherein the control-stick is made of electrical conductive material;

a ring made of electrical insulating material fixedly coupled around the stem portion of the control-stick; and a plurality of biasing curved arm members extending from the ring to form a radial arrangement around the stem portion of the control-stick in a manner so as to be movable with the control-stick as a whole relative to the hollow housing along a plane at least substantially perpendicular to the stem portion, wherein each of the plurality of biasing curved arm members extends from the ring along the plane and has a curved segment with a convex side of the curved segment directed towards a respective corresponding portion of the endless boundary structure of the hollow housing so as to bias the stem portion of the control-stick away from the respective corresponding portion of the endless boundary structure of the hollow housing when the control-stick is being moved towards the respective corresponding portion of the endless boundary structure, wherein the plurality of biasing curved arm members are distributed along a circumference of the stem portion of the control-stick in a manner so as to cooperate with each other to centre the control-stick with respect to the opening of the ceiling of the hollow housing.

11. The joystick device of claim 10, wherein the stem portion of the control-stick comprises an endless groove around a cylindrical surface of the stem portion of the control-stick, and wherein the ring is insert moulded into the endless groove of the stem portion of the control-stick.

12. The joystick device of claim 10, wherein the plurality of biasing curved arm members are integrally moulded with the ring, wherein each of the plurality of biasing curved arm members comprises a first end integral to the ring and a second free-end.

13. The joystick device of claim 12, wherein the plurality of biasing curved arm members are made of polypropylene.

14. The joystick device of claim 10, wherein the ring and the plurality of biasing curved arm members are separate parts coupled together such that each of the plurality of biasing curved arm members extends from the ring.

15. The joystick device of claim 14, wherein each of the plurality of biasing curved arm members has a first end coupled to the ring and a second end coupled to an adjacent biasing curved arm member.

16. The joystick device of claim 14, wherein the plurality of biasing curved arm members are made of metal.

17. The joystick device of claim 14, wherein the ring and the plurality of biasing curved arm members are coupled via a heat staking process.

18. The joystick device of claim 10, wherein the hollow housing is configured to be attached to a touchscreen with the control-stick at least substantially perpendicular to the touchscreen, wherein movement of the control-stick is detectable by the touchscreen.

19. A method of manufacturing a joystick device, the method comprising:

insert moulding a ring made of electrical insulating material around a stem portion of a control-stick made of electrical conductive material, wherein four biasing curved arm members extends from the ring to form a quatrefoil-like shape around the stem portion of the control-stick; and providing the control-stick to a hollow housing which comprises an endless boundary structure and a ceiling structure to define an internal space and which is provided with an opening through the ceiling structure of the hollow structure such that the hollow housing surrounds the stem portion of the control-stick and the control-stick extends through the opening in the ceiling structure of the hollow housing with the head portion of the control-stick outside the hollow housing, wherein the four biasing curved arm members and the control-stick are movable as a whole relative to the hollow housing along a plane at least substantially perpendicular to the stem portion of the control-stick, wherein each of the four biasing curved arm members extends from the ring along the plane and has a curved segment with a convex side of the curved segment directed towards a respective corresponding portion of the endless boundary structure of the hollow housing so as to bias the stem portion of the control-stick away from the respective corresponding portion of the endless boundary structure of the hollow housing when the control-stick is being moved towards the respective corresponding portion of the endless boundary structure, wherein the four biasing curved arm members are distributed along a circumference of the stem portion of the control-stick in a manner so as to cooperate with each other to centre the control-stick with respect to the opening of the ceiling of the hollow housing.

20. The method of claim 19, wherein the stem portion of the control-stick comprises an endless groove around a cylindrical surface of the stem portion of the control-stick, and wherein the insert moulding of the ring around the stem portion of the control-stick comprises insert moulding the ring into the endless groove of the stem portion of the control-stick.

* * * * *